US 6,538,188 B2

(12) United States Patent
Kondo

(10) Patent No.: US 6,538,188 B2
(45) Date of Patent: Mar. 25, 2003

(54) ELECTRONIC MUSICAL INSTRUMENT WITH DISPLAY FUNCTION

(75) Inventor: Masao Kondo, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 10/091,097

(22) Filed: Mar. 4, 2002

(65) Prior Publication Data
US 2002/0121180 A1 Sep. 5, 2002

(30) Foreign Application Priority Data

Mar. 5, 2001 (JP) ........................... 2001-060165

(51) Int. Cl.[7] ............................................. G09B 15/02
(52) U.S. Cl. .................................................. 84/477 R
(58) Field of Search ............................. 84/477 R, 478

(56) References Cited

U.S. PATENT DOCUMENTS 6,084,168 A * 7/2000 Sitrick ...................... 84/477 R
6,348,648 B1 * 2/2002 Connick .................... 84/477 R

FOREIGN PATENT DOCUMENTS

JP   10-254435   9/1998
JP   10-254468   9/1998

* cited by examiner

Primary Examiner—Stanley J. Witkowski
(74) Attorney, Agent, or Firm—Morrison & Foerster LLP

(57) ABSTRACT

The electronic musical instrument includes a keyboard 10 and an operation panel 20. The operation panel 20 includes a display 21 and a control operator 22 for selecting and setting various modes in the electronic musical instrument. Part of the control operator 22 is used for changing various modes in the electronic musical instrument by a combination with a display screen on the display 21. The display 21 is controlled by a display control circuit 23 having a screen data memory 23a, and displays a lyric screen, score screen, and various mode setting screens. An image data output circuit 51 having an image data memory 51a for outside, which is independent from the image data memory 23a, outputs an image data to outside and displays the lyric screen, score screen, and various mode setting screens on an external displayer 53 independently from the display 21.

9 Claims, 8 Drawing Sheets

Fig.9A
tyûripu
saita     saita
tyûripu     no     hana     ga
Fig.9B
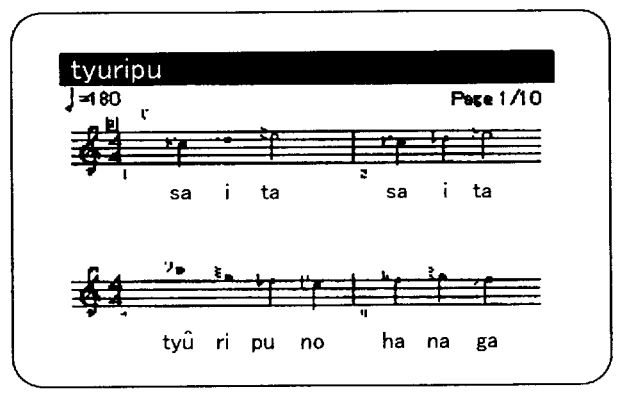
Fig.9C
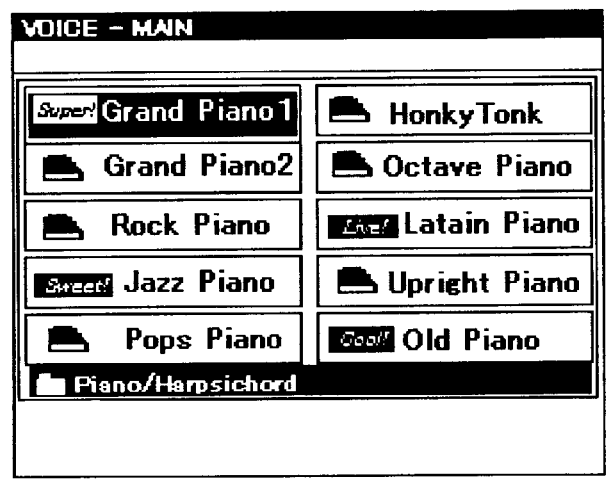

ELECTRONIC MUSICAL INSTRUMENT WITH DISPLAY FUNCTION

BACKGROUND OF THE INVENTION

1. Field of the Invention

The present invention relates to an electronic musical instrument having, on an operation panel, a displayer for displaying a setting screen for setting a music sound element such as a tone color, tone volume, or effect of a music sound signal to be generated or for displaying a lyric or score.

2. Description of the Background Art

From the past, it is known in the art to dispose a main-side displayer on an operation panel surface of an electronic musical instrument having a keyboard and provide the electronic musical instrument with an image data output terminal, whereby a lyric or score is displayed on the main-side displayer and also an image data representing the image displayed on the main-side displayer is supplied to the image data output terminal so that the lyric or score can also be displayed on an external displayer connected to the output terminal via a cable.

Further, the main-side displayer disposed on the operation panel surface is also used for selecting and setting a music sound element such as a tone color, tone volume, or effect of a music sound signal to be generated in the electronic musical instrument. In this case, when a control operator disposed on the operation panel surface is operated while the main-side displayer is displaying a screen for setting the music sound element, the music sound element such as a tone color, tone volume, or effect of the music sound signal to be generated in the electronic musical instrument is selected and set in accordance with a combination of a displaying state of the main-side displayer and an operation of the control operator.

However, in the aforesaid conventional device, when a player changes the displaying state of the main-side displayer for changing the music sound element such as a tone color, tone volume, or effect of a playing sound while the lyric or score is being displayed on the external displayer, the lyric or score displaying screen of the external displayer is also changed to the music sound element setting screen. This leads to a disadvantage such that, if another person is singing a song by looking at a lyric displayed on the external displayer or is playing another musical instrument by looking at a score displayed on the external displayer while listening to the playing sound of the electronic musical instrument played by a player, the person can no longer look at the lyric or score.

SUMMARY OF THE INVENTION

The present invention has been made in order to solve the aforementioned problem of the prior art, and an object thereof is to provide an electronic musical instrument in which the contents displayed on a main-side displayer that is provided in the electronic musical instrument are made independent from the contents displayed on an external displayer so that, even if the contents displayed on the main-side displayer are changed, the contents displayed on the external displayer will not be changed by interlocking.

In order to achieve the aforesaid object, a characteristic constructional feature of the present invention lies in an electronic musical instrument including a play operator that designates a pitch of a music sound signal to be generated; a control operator that is disposed on an operation panel; a main-side displayer that is disposed on the operation panel and capable of selectively displaying a setting screen for setting a music sound element of the music sound signal to be generated and a lyric or score screen for displaying a lyric or score; an image data output terminal for outputting an image data to outside; a display control circuit that has a first image data memory for main body and controls a display of the main-side displayer on a basis of an image data stored in the first image data memory for main body; an image data output circuit that has a second image data memory for outside and outputs an image data stored in the second image data memory for outside to the image data output terminal; a music sound element setting controller for setting and controlling the music sound element of the music sound signal to be generated by a combination of a setting screen displayed on the main-side displayer and an operation of the control operator; and an image data writing circuit for selectively writing an image data into the first image data memory for main body and into the second image data memory for outside in accordance with an operation of the control operator.

In the electronic musical instrument constructed as described above, the display control circuit controls the display of the main-side displayer on a basis of an image data stored in the first image data memory for main body. The image data output circuit outputs an image data stored in the second image data memory for outside to the image data output terminal. The first image data memory for main body and the second image data memory for outside are provided independently from each other, and the image data are selectively written into the first image data memory for main body and into the second image data memory for outside in accordance with an operation of the control operator disposed on the operation panel. Therefore, when an external displayer is connected to the image data output terminal, different screens can be independently displayed on the main-side displayer and on the external displayer. Thus, in a state in which the setting screen is being displayed on the main-side displayer and the control operator is being operated to allow the music sound element setting controller to change the music sound element of the music sound signal to be generated, the displaying state of the external displayer can be maintained in a different displaying state independently from the main-side displayer.

Therefore, according to the present invention, preparation of a setting screen data for displaying a setting screen and a lyric or score data for displaying a lyric or score allows that, even if the player changes the displaying state of the main-side displayer to the setting screen so as to change the music sound element such as a tone color, tone volume, or effect of the playing sound while the lyric or score is being displayed on the external displayer, one can continue to display the lyric or score on the external displayer. This leads to an advantage when another person is singing a song by looking at a lyric displayed on the external displayer or is playing another musical instrument by looking at a score displayed on the external displayer while listening to the playing sound of the electronic musical instrument played by the player.

In this case, the electronic musical instrument may further include a display data memory for storing in advance a setting screen data for displaying the setting screen and a lyric or score data for displaying the lyric or score, wherein the image data writing circuit may selectively read the setting screen data and the lyric or score data from the display data memory in accordance with an operation of the control operator, and selectively renew the image data stored in the first image data memory for main body and the image data stored in the second image data memory for outside on a basis of the read data.

Another characteristic constructional feature of the present invention lies in that the image data writing circuit may read the lyric or score data from the display data memory in accordance with lapse of time, and renew the image data stored in the first image data memory for main body and the image data stored in the second image data memory for outside on a basis of the read lyric or score data.

This allows that the lyric or score displayed on the main-side displayer and on the external displayer can be successively changed in accordance with the progression of the music. Therefore, a player playing the electronic musical instrument or another person looking at the external displayer can advantageously play a musical instrument or sing a song while looking at a lyric or score that changes its displaying state in accordance with the progression of the music.

Still another characteristic constructional feature of the present invention lies in that the electronic musical instrument further includes an automatic play data memory for storing an automatic play data for automatic generation of the music sound signal; and an automatic play data reading circuit for reading the automatic play data stored in the automatic play data memory in accordance with lapse of time and for controlling the generation of the music sound signal on a basis of the read automatic play data.

This allows that the automatic playing sound can also be generated together from the electronic musical instrument, leading to an advantage for other persons that are playing a musical instrument or singing a song while looking at the external displayer.

BRIEF DESCRIPTION OF THE DRAWINGS

FIG. 9(A) is a view illustrating an example of a lyric screen;

FIG. 9(B) is a view illustrating an example of a score screen; and

FIG. 9(C) is a view illustrating an example of a tone color setting screen.

DESCRIPTION OF THE PREFERRED EMBODIMENTS

Figure 1:
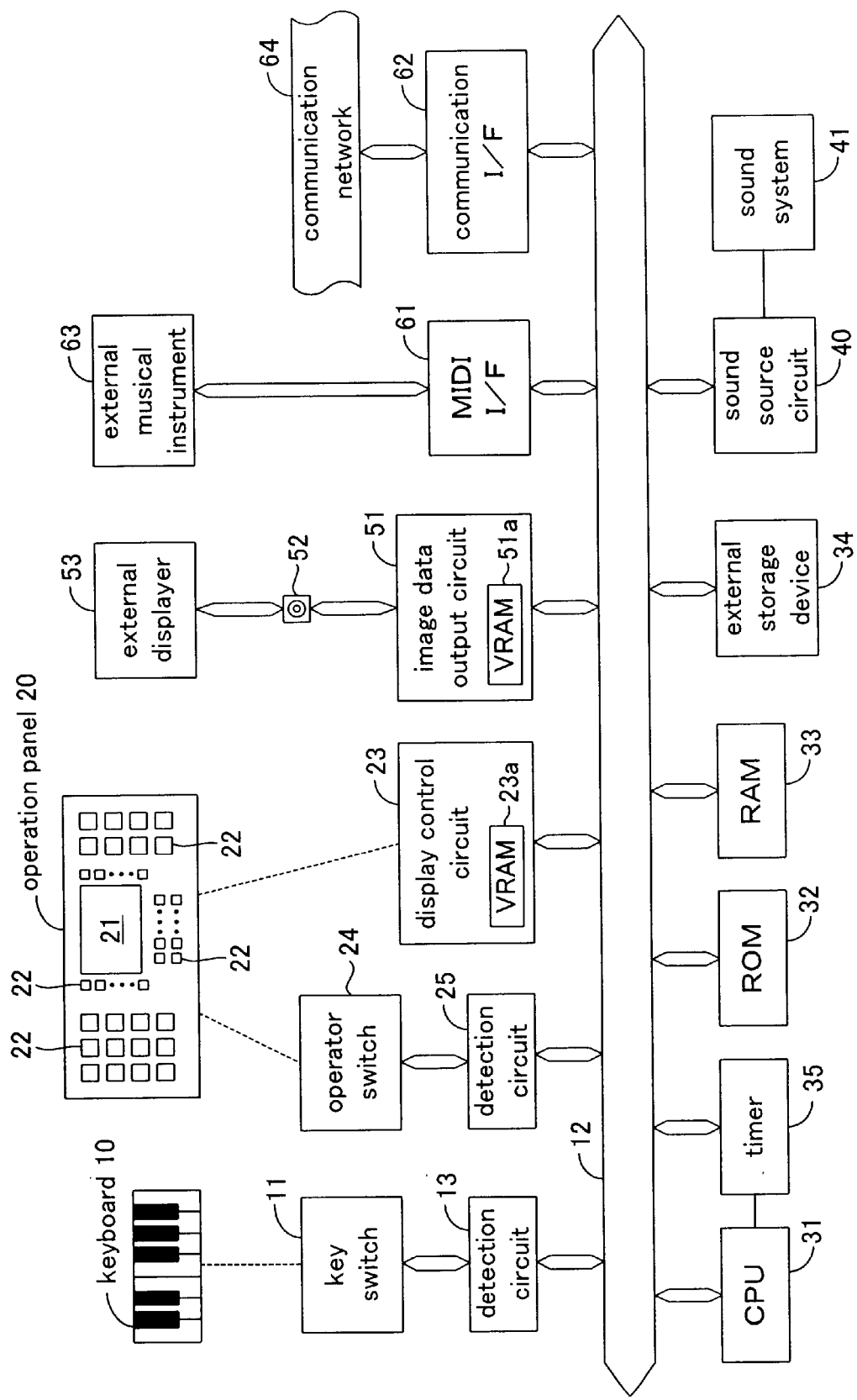
FIG. 1 is a schematic block diagram of an electronic musical instrument according to one embodiment of the present invention.

Hereafter, one embodiment of the present invention will be described with reference to the attached drawings. FIG. 1 is a block diagram illustrating an electronic musical instrument according to this embodiment.

This electronic musical instrument includes a keyboard 10 and an operation panel 20. Keyboard 10 is made of a plurality of keys functioning as a play operator. By depressing or releasing each key, a key switch 11 disposed in correspondence with each key is turned on/off. The on/off of key switch 11 is detected by a detection circuit 13 connected to a bus 12.

A display 21 and numerous control operators 22 are disposed on operation panel 20. Display 21 is constituted with a liquid crystal displayer and functions as a main-side displayer. Display 21 is constructed to be capable of at least displaying a setting screen for setting a music sound element such as a tone color, tone volume, or effect of a music sound signal to be generated or for setting a display screen mode of a later-described external displayer 53, and to be capable of displaying a lyric or score screen for displaying a lyric or score. Here, a different displayer such as a small cathode-ray tube device other than a liquid crystal displayer may be employed as this display 21. Display 21 is controlled by a display control circuit 23 connected to bus 12. This display control circuit 23 incorporates an image data memory 23a for storing an image data representing an image displayed on display 21.

Control operators 22 control the operation of this electronic musical instrument and, by each operation, the operator switch 24 respectively corresponding to each control operator 22 is turned on/off. Particularly, control operators 22 include operators for selecting a display mode of display 21, operators for selecting a music sound element, a display mode of the later-described external displayer 53, and others by a combination with a displaying state of display 21, a start operator and a stop operator for controlling an operation of automatic play, operators for selecting a desired piece of music, and other operators. The on/off of operator switch 24 is detected by a detection circuit 25 connected to bus 12.

A CPU 31, a ROM 32, a RAM 33, an external storage device 34, a timer 35, and a sound source circuit 40 are connected to bus 12. CPU 31, ROM 32, RAM 33, and timer 35 constitute a main body part of a microcomputer, and controls various operations of this electronic musical instrument by execution of programs. External storage device 34 includes various recording media such as a hard disk HD incorporated in advance in this electronic musical instrument, and a compact disk CD, a mini disk MD, a flexible disk FD, and others that can be mounted onto the electronic musical instrument, as well as a drive unit for each of these recording media, and enables storage and reading-out of a large amount of data and programs.

Figure 2:
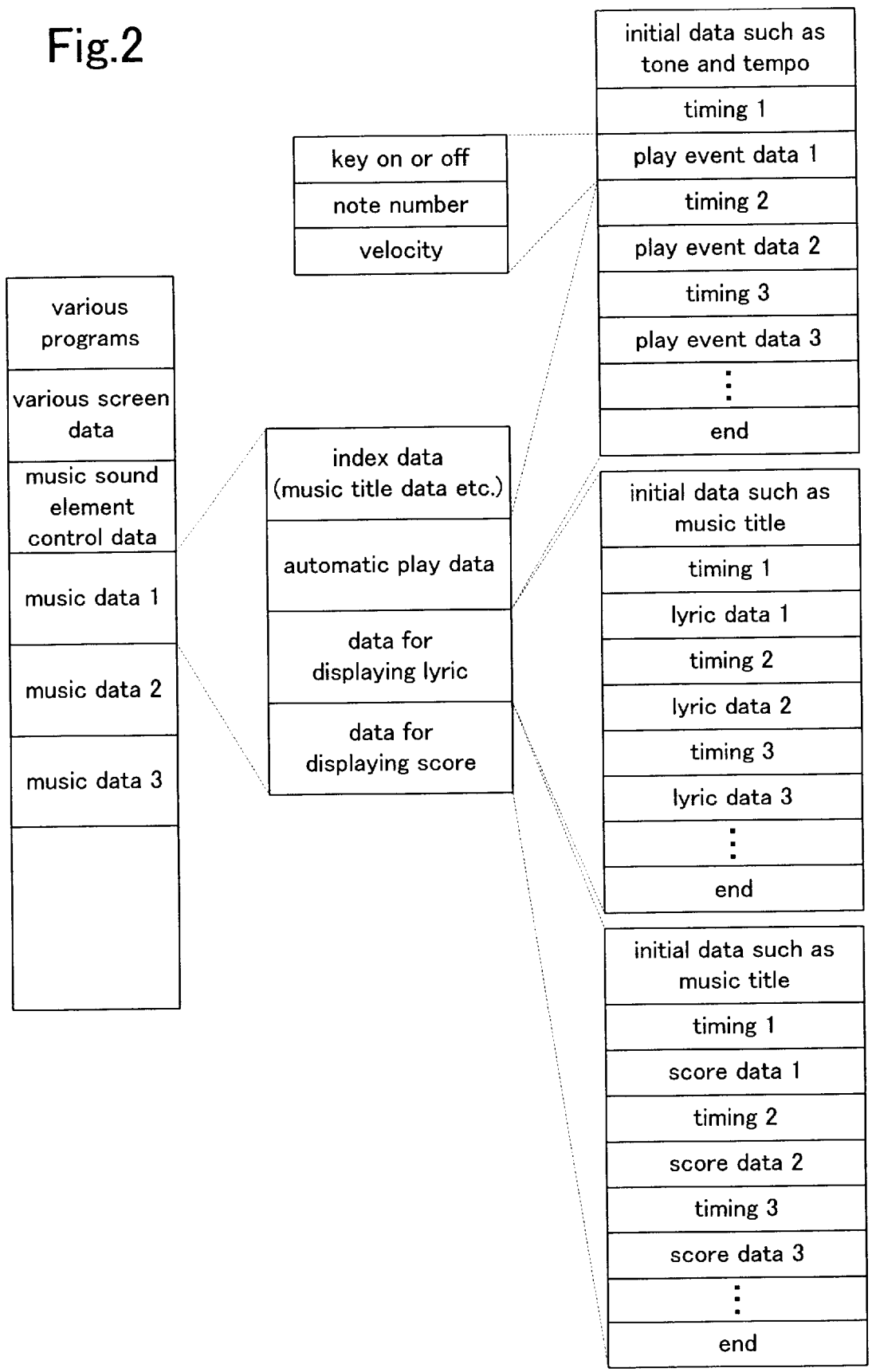
FIG. 2 is a format diagram of various data used in the electronic musical instrument.

In this embodiment, hard disk HD stores various programs including the programs of FIGS. 3 to 6 and various data used in execution of the various programs, as illustrated in FIG. 2. These programs and data are supplied, for example, from compact disk CD, mini disk MD, or flexible disk FD to hard disk HD, or supplied from outside to hard disk HD via an external music apparatus 63 or a communication network 64 mentioned later.

The various data include at least various screen data, music sound element control data, and plural sets of music data respectively corresponding to plural pieces of music. The various screen data are image data representing various display screens on display 21 and on external displayer 53. The music sound element control data are data for controlling the tone color, tone volume (amplitude envelope), or effect of music sound signals that are selected by a player or designated by automatic play data and formed in sound source circuit 40.

Each of the music data is made of an index data, an automatic play data, a data for displaying a lyric, and a data for displaying a score. The index data is made of a music title data representing the title of the music, a key data representing the key of the music, a data representing a data form type, and others.

The automatic play data is made of an initial data that determines the tone color of the music sound signals generated at the initial time, the initial music reproduction tempo, and others, a series of play event data, a series of timing data, an end data, and others. The play event data represents a play event of a musical instrument in accordance with the progression of the music, and is made of, for example, a key-on or key-off data representing the depressing or releasing of a key, a note number data representing the key (pitch) of the depressed or released key, and a velocity data representing the speed (tone volume) of depressing the key. The play event data may further include a tone color data, a tempo data, and others representing a change in the tone color and reproduction tempo during the play. The timing data represents the period of time between the play events. The end data represents the end of the music.

The data for displaying a lyric is made of an initial data such as a music title data representing the title of the music, a series of lyric data, a series of timing data, an end data, and others. The lyric data represents the letters constituting the lyric, and the timing data represents the period of time between the letters. The end data represents the end of the music.

The data for displaying a score is made of an initial data such as a music title data representing the title of the music and a key data representing the key of the music, a series of score data, a series of timing data, an end data, and others. The score data represents the notes, rests, semitone symbols, and others of the music, and the timing data represents the period of time between the score data. The end data represents the end of the music.

Sound source circuit 40 forms music sound signals on the basis of the play information (key-on signal, key-off signal, note number, velocity, and others) from CPU 31. In forming the music sound signals, sound source circuit 40 also controls the music sound elements of the music sound signals on the basis of the music sound element control data for controlling the music sound elements such as a tone color, tone volume (amplitude envelope), and effect from CPU 31. The music sound signals formed in sound source circuit 40 are output to a sound system 41. Sound system 41 is made of an amplifier, a speaker, and others, and generates music sounds corresponding to the aforesaid output music sound signals.

Further, an image data output circuit 51, a MIDI interface circuit 61, and a communication interface circuit 62 are also connected to bus 12. Image data output circuit 51 incorporates an image data memory 51a for outside, which stores an image data to be output to the outside, and outputs the image data written into the memory 51a to an image data output terminal 52. An external displayer 53 is to be connected to this image data output terminal 52 via a cable or the like. External displayer 53 is constituted with a CRT display, a liquid crystal displayer, or the like, which is larger than the aforesaid display 21, and is constructed so as to be at least capable of displaying a setting screen and a lyric or score screen similar to those in the case of the aforesaid display 21. Here, the output format of the image data output from image data output circuit 51 to external displayer 53 via image data output terminal 52 may be either an ordinary video output format or a high-quality image output format.

MIDI interface circuit 61 serves to communicate with an external music apparatus 63 connected to the interface circuit 61 for exchanging data related to music such as the aforesaid automatic play data, lyric displaying data, and score displaying data. Communication interface circuit 62 can be connected to the outside via communication network 64, whereby this electronic musical instrument can communicate various programs and data with the outside.

Next, the operation of the embodiment constructed as shown above will be described. When a user turns the power switch (not illustrated) of the electronic musical instrument on or operates any of the control operators 22 after turning the power switch on, CPU 31 executes an initial setting operation of this electronic musical instrument by execution of the programs (not illustrated) stored in ROM 32. In this initial setting operation, CPU 31 reads various programs including the programs of FIGS. 3 to 6, various screen data, and music sound element control data, which are stored in the hard disk HD of external storage device 34, out for storage in RAM 33, and starts a predetermined program stored in RAM 33.

Here, if the various programs are not stored in the hard disk HD, various programs stored in a compact disk CD, a mini disk MD, a flexible disk FD, or the like are stored into the hard disk, or the aforesaid various programs are downloaded into the hard disk HD from external music apparatus 63 or from the outside via communication network 64, and then the various programs are transferred to RAM 33 for being started. Further, a part of the aforesaid various programs, various screen data, and music sound element control data may be allowed to remain stored in the hard disk HD or in other recording media in accordance with the needs instead of being stored in the aforesaid RAM 33.

First, a tone color setting operation and a display control operation of display 21 and external displayer 53 by operation of the control operators 22 provided on the operation panel 20 will be described. Control operators 22 include control operators for respectively displaying a tone color setting screen, a lyric displaying screen, a score displaying screen, a display mode setting screen for external displayer 53, and other display screens on display 21. When these control operators are operated, CPU 31 starts the main body image mode setting program of FIG. 3 in step S100, and determines which of the control operators 22 has been operated in step S102. Then, by this determination process, after various processes corresponding to the operation of control operators 22 have been carried out in steps S104 to S134, the execution of this main body image mode setting program is ended in step S136.

When the control operator 22 for displaying a tone color setting screen is operated, the procedure goes to step S104 by the determination process of step S102. In step S104, a setting screen flag LCF1 and a tone color setting flag VCF1 are respectively set to be "1", and a lyric flag LRF1 and a score flag SCF1 are respectively reset to be "0". In the same step S104, various setting flags other than the tone color setting flag VCF1 are reset to be "0". The various setting flags other than the tone color setting flag VCF1 include a setting flag for selecting the effect imparted to the music sound signals, a setting flag for selecting the type of automatic rhythm, and other flags in addition to an external display mode setting flag ODF1 for setting the display mode of external displayer 53 mentioned later.

The setting screen flag LCF1 represents the display on display 21 of various setting screens for setting the operation of the electronic musical instrument in accordance with an operation of the control operators 22 when it is "1", and represents the display on display 21 of other screens when it is "0". The tone color setting flag VCF1 represents the display on display 21 of the setting screen for setting the tone color of the music sound signals in accordance with an operation of the control operators 22 when it is "1", and represents the display on display 21 of other screens when it is "0". The lyric flag LRF1 represents the display on display 21 of a lyric screen when it is "1", and represents the display on display 21 of other screens when it is "0". The score flag SCF1 represents the display on display 21 of a score screen when it is "1", and represents the display on display 21 of other screens when it is "0". The other various setting flags represent the display on display 21 of setting screens for setting the parameters to control various operations of the electronic musical instrument corresponding to various flags in accordance with the operation of the control operators 22 when they are "1", and represent the display on display 21 of other screens when they are "0", in the same manner as the tone color setting flag VCF1.

Figure 7:
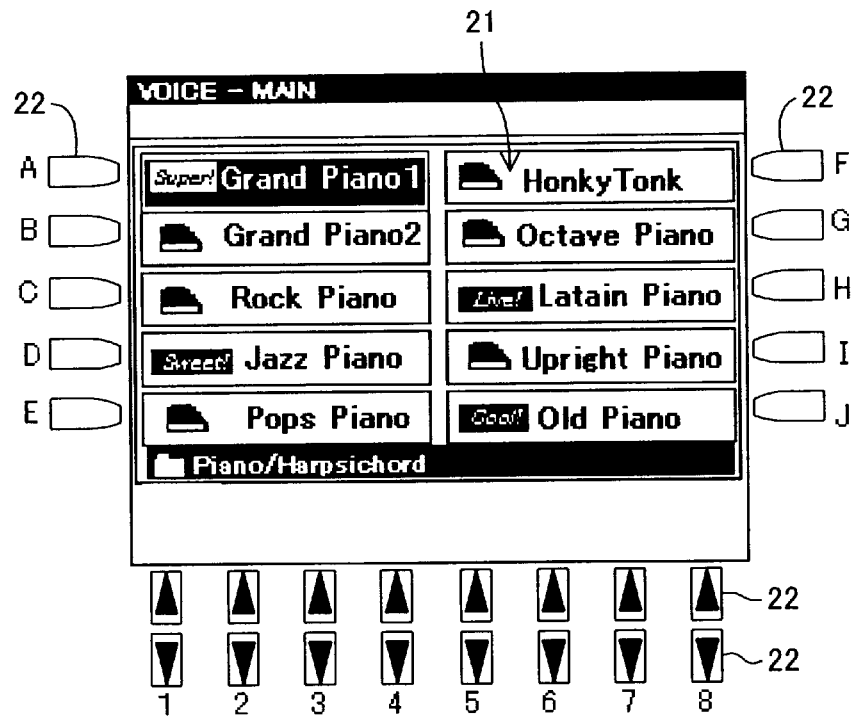
FIG. 7 is a view illustrating an example of arranging a tone color setting screen and operators on the display of FIG. 1.

After the process of the aforesaid step S104, the tone color setting screen data included in the various screen data stored in RAM 33 by the above-described initial setting process are read out and written into image data memory 23a in step S106. In other words, the image data for main body are changed to screen data for tone color setting. Display control circuit 23 controls display 21 on the basis of the tone color setting screen data written in image data memory 23a, and displays on display 21 a tone color setting screen such as shown in FIGS. 7 and 9(C). Here, an operation of setting the tone color of the music sound signals by operating the control operators 22 in this displaying state will be described later.

When a control operator 22 for displaying a lyric screen is operated, the procedure goes to step S108 by the determining process of step S102. In step S108, CPU 31 determines whether the lyric flag LRF1 is "0" or not. When the lyric flag LRF1 is "0", CPU 31 determines as "YES" in step S108 to set the lyric flag LRF1 to be "1" and to reset the score flag SCF1 and the setting screen flag LCF1 to be "0" in step S110.

After the aforesaid process of step S110, a lyric displaying data included in the music data which are related to the newest music currently selected by a later-mentioned process of the automatic play setting program and which are written into RAM 33 from the hard disk HD, i.e. external storage device 34, is read out and the read-out lyric displaying data is converted into a lyric image data and written into image data memory 23a. In other words, the image data for main body is changed to a screen data for lyric. In this case, in a state in which the automatic play is not operating, a lyric image data corresponding to the lyric data of a predetermined interval from the beginning in the lyric displaying data is written into image data memory 23a. In a state in which the automatic play is operating, a lyric image data corresponding to the lyric data of a predetermined interval located at the position corresponding to the progression of the music is written into image data memory 23a. Display control circuit 23 controls display 21 on the basis of this lyric image data written into image data memory 23a, and displays a lyric screen such as shown in FIG. 9(A) on display 21.

On the other hand, if it is determined as "NO" in the aforesaid step S108, i.e. if the lyric flag LRF1 is "1", the lyric flag LRF1 and the score flag SCF1 are reset to be "0", and the setting screen flag LCF1 is set to be "1" in step S114.

After the aforesaid process of step S114, a set of setting screen data corresponding to various setting flags (including the tone color setting flag VCF1) set to be "1" among the aforesaid various screen data stored in RAM 33 are read out and written into image data memory 23a in step S116. In other words, the image data for main body is changed to setting screen data corresponding to various setting flags. Display control circuit 23 controls display 21 on the basis of the setting screen data written into this image data memory 23a, and displays the setting screens corresponding to the various setting flags on display 21. In this case, if for example the tone color setting flag VCF1 is "1", the tone color setting screen is displayed on display 21 in the same manner as in the aforesaid step S106. The various setting flags other than the tone color setting flag VCF1 include, for example, a setting flag for selecting the effect imparted to the music sound signals, a setting flag for selecting the type of the automatic rhythm, and other flags. If these setting flags are "1", then an effect selecting screen, a rhythm type selecting screen, and other screens are displayed on display 21.

When a control operator 22 for displaying a score screen is operated, the procedure goes to step S118 by the determining process of step S102. In step S118, CPU 31 determines whether the score flag SCF1 is "0" or not. When the score flag SCF1 is "0", CPU 31 determines as "YES" in step S118 to set the score flag SCF1 to be "1" and to reset the lyric flag LRF1 and the setting screen flag LCF1 to be "0" in step S120.

After the aforesaid process of step S120, a score displaying data included in the music data which are related to the aforesaid newest music and which are written into RAM 33 from the hard disk HD, i.e. external storage device 34, is read out and the read-out score displaying data is converted into a score image data and written into image data memory 23a in step S122. In other words, the image data for main body is changed to a screen data for score. In this case also, in a state in which the automatic play is not operating, a score image data corresponding to the score data of a predetermined interval from the beginning in the score displaying data is written into image data memory 23a. In a state in which the automatic play is operating, a score image data corresponding to the score data of a predetermined interval located at the position corresponding to the progression of the music is written into image data memory 23a. Display control circuit 23 controls display 21 on the basis of this score image data written into image data memory 23a, and displays a score screen such as shown in FIG. 9(B) on display 21.

On the other hand, if it is determined as "NO" in the aforesaid step S118, i.e. if the score flag SCF1 is "1", the score flag SCF1 and the lyric flag LRF1 are reset to be "0", and the setting screen flag LCF1 is set to be "1" in step S124. After the aforesaid process of step S124, processes similar to those of the aforesaid step S116 are carried out in step S126 to change the image data for main body in image data memory 23a to setting screen data corresponding to various setting flags. Display control circuit 23 then controls display 21 on the basis of the changed setting screen data, and displays the setting screens corresponding to the various setting flags on display 21.

When a control operator 22 for displaying a display mode setting screen for external displayer 53 is operated, the procedure goes to step S128 by the determining process of step S102. In step S128, the setting screen flag LCF1 and the external display mode setting flag ODF1 are set to be "1", and the lyric flag LRF1 and the score flag SCF1 are reset to be "0". In the same step S128, various other setting flags including the tone color setting flag VCF1 other than the external display mode setting flag ODF1 are also reset to be "0".

After the aforesaid process of step S128, external display mode setting screen data included in the various screen data stored in RAM 33 by the aforementioned initial setting process is read out in step S130 and written into image data memory 23a. In other words, the image data for main body is changed to external display mode setting screen data. Display control circuit 23 controls display 21 on the basis of this external display mode setting screen data written into image data memory 23a, and displays on display 21 the display mode setting screen for external displayer 53 shown in FIG. 8. Here, an operation of setting the display mode of external displayer 53 by operation of the control operators 22 in this displaying state will be described later.

Further, when a control operator 22 for displaying a setting screen other than the above-described ones is operated, the processes of steps S132, S134 are carried out by the determining process of step S102. In step S132, flag processes similar to those of the aforesaid steps S104, S128 are carried out in accordance with the operated control operators 22. In step S134, a process of changing the image data for main body similar to those of the aforesaid steps S106, S130 are carried out in accordance with the operated control operators 22.

Next, an operation of setting the tone color, external display mode, and other operations of the electronic musical instrument in the state in which the tone color setting screen, external display mode setting screen, and other setting screens are displayed on display 21 by the aforesaid processes of steps S106, S116, S126, S130, S134 will be described. In this case, when a control operator 22 located near display 21 among numerous control operators 22 is operated, CPU 31 executes the screen use mode switching program of FIG. 4.

The execution of this screen use mode switching program is started in step S200, and CPU 31 determines in step S202 whether display 21 is displaying the tone color setting screen or not. Specifically, CPU 31 may determine whether the setting screen flag LCF1 and the tone color setting flag VCF1 are both "1" or not. If it is determined as "YES" by this determination, the tone color of the music sound signals is set in accordance with the above-described operation of the control operators 22 disposed near display 21 in step S204, and the execution of the screen use mode switching program is ended in step S226.

This tone color setting process will be described in detail hereafter by raising one example. In this state, display 21 is displaying letters representing the tone color such as "Grand Piano" and "Rock Piano", as illustrated in the aforesaid FIG. 7 (FIG. 9(C)). In this case, the control operators 22 disposed near to the right and left of display 21 and located adjacent to the letters representing the tone colors correspond respectively to the tone colors displayed by the aforesaid letters. Operation of any of these control operators 22 disposed near to the right and left of display 21 means selection of a tone color corresponding to the operated control operator 22. Therefore, in the tone color setting process of step S204, tone color control data corresponding to the aforesaid operated control operator 22 included in the music sound element control data transferred and stored into RAM 33 by the initial setting is read out and supplied to sound source circuit 40.

In sound source circuit 40, the tone color control data presently stored is renewed to the tone color control data now supplied. By this process, the tone color of the music sound signals which are based on the play operation of keyboard 10 and which are to be formed from now on by sound source circuit 40 will be determined by the aforesaid new tone color control data.

Figure 8:
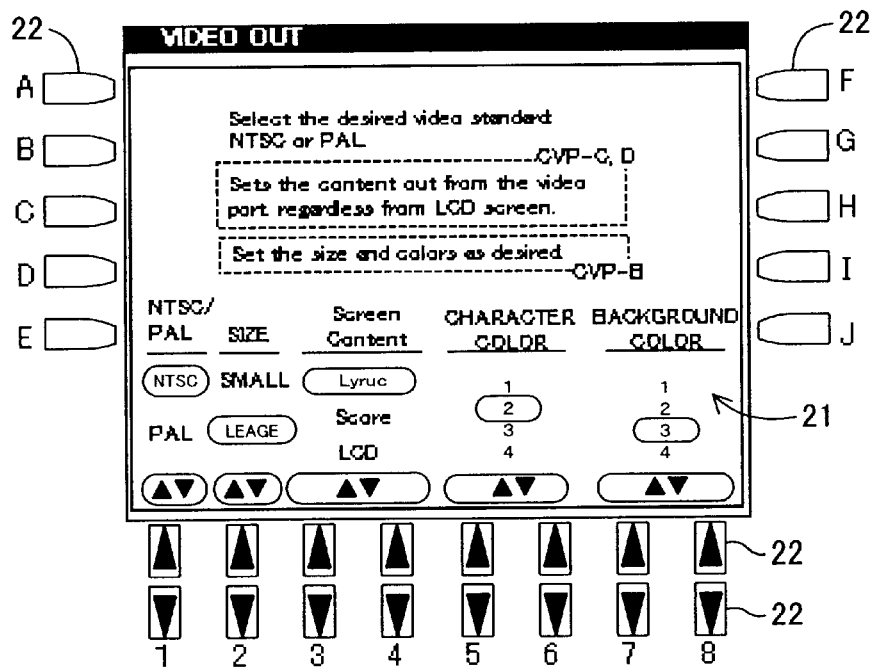
FIG. 8 is a view illustrating an example of arranging an external displayer mode setting screen and operators on the display of FIG. 1.

Further, assume that display 21 has been displaying the display mode setting screen for external displayer 53 as shown in FIG. 8 when a control operator 22 located near display 21 is operated. In this case, CPU 31 determines as "NO" in step S202, and determines as "YES" in step S206, i.e. that display 21 is now displaying the display mode setting screen for external displayer 53. Specifically, CPU 31 may determine whether the setting screen flag LCF1 and the external display mode setting flag ODF1 are both "1" or not. After the aforesaid determination of "YES" in step S206, by the processes of steps S208 to S222, the display mode of external displayer 53 is set in accordance with the aforesaid operation of the control operators 22 located near display 21, and the execution of the screen use mode switching program is ended in step S226.

This display mode setting process for external displayer 53 will be described in detail hereafter by raising one example. In this state, display 21 is now displaying letters related to the display modes such as "SIZE SMALL LARGE" and "Screen Content Lyric Score LCD", as illustrated in the aforesaid FIG. 8. Description related to "SIZE" and others will be omitted, since they are not directly related to the present invention, and only the description related to "Screen Content" will be given in detail hereafter.

In this case, the control operators 22 disposed near under display 21 and located under the letters function as operators for cursor movement of the letters. Namely, among two rows of control operators 22 located under the display of "Screen Content Lyric Score LCD", operators of the upper row have a function of moving the cursor upward, and the operators of the lower row have a function of moving the cursor downward. When control operators 22 of these two rows are operated, the cursor is moved by the process of step S208, and the position of cursor movement is determined in step S210.

Now, assuming that the cursor has moved to a lyric position (uppermost position), the procedure goes to step S212 by the determining process of step S210. In step S212, the lyric flag LRF2 is set to be "1", while the score flag SCF2 and the main body display flag LCF2 are reset to be "0". The lyric flag LRF28 represents display of a lyric screen on external displayer 53 when it is "1", and represents display of a screen other than the lyric screen on external displayer 53 when it is "0". The score flag SCF2 represents display of a score screen on external displayer 53 when it is "1", and represents display of a screen other than the score screen on external displayer 53 when it is "0". The main body display flag LCF2 represents display of the same screen as display 21 on external displayer 53 when it is "1", and represents display of a screen other than that on external displayer 53 when it is "0".

Figure 3:
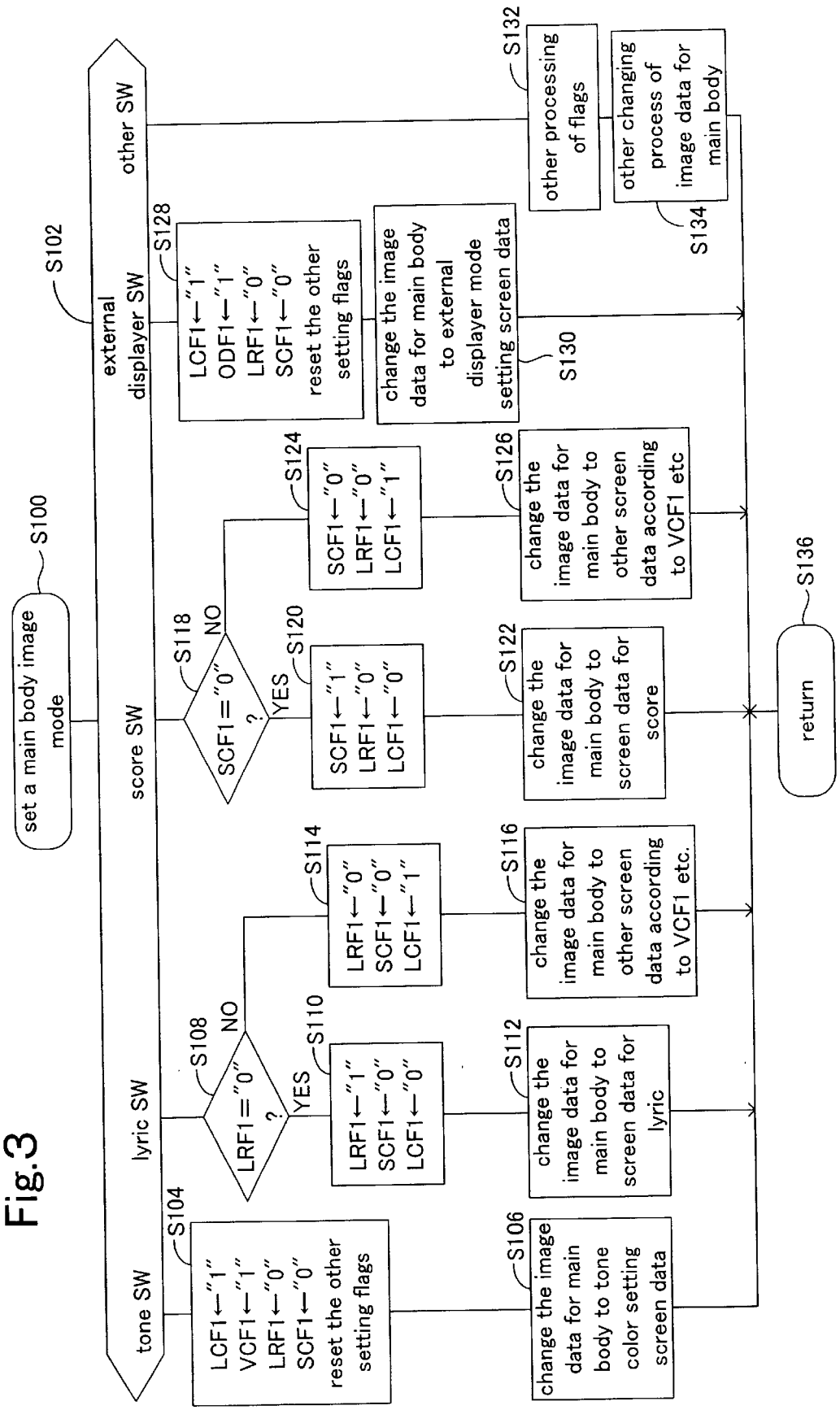
FIG. 3 is a flowchart of a main body image mode setting program executed by the CPU of FIG. 1.

After the aforesaid process of step S212, a lyric data similar to that of the aforesaid step S112 of FIG. 3 is read out from RAM 33 in step S214 and converted into a lyric image data which is then written into image data memory 51a for outside in image data output circuit 51. Thereafter, the execution of this screen use mode switching program is ended in step S226. In other words, the image data for outside is changed to a lyric screen data. Image data output circuit 51 reads the image data for outside that is written in image data memory 51a for outside, and outputs it to image data output terminal 52. Therefore, if external displayer 53 is connected to image data output terminal 52, external displayer 53 receives the aforesaid output image data for outside and displays a lyric (See FIG. 9(A)). Hereafter, description will be given assuming that external displayer 53 is connected to image data output terminal 52.

Further, assuming that the cursor has moved to a score position (central position) by the aforesaid process of step S208, the procedure goes to step S216 by the determining process of step S210. In step S216, the score flag SCF2 is set to be "1", while the lyric flag LRF2 and the main body display flag LCF2 are reset to be "0".

After the aforesaid process of step S216, a score data similar to that of the aforesaid step S112 of FIG. 3 is read out from RAM 33 in step S218 and converted into a score image data which is then written into image data memory 51a for outside in image data output circuit 51. Thereafter, the execution of this screen use mode switching program is ended in step S226. In other words, the image data for outside is changed to a score screen data. Image data output circuit 51 reads the image data for outside that is written in image data memory 51a for outside, and outputs it to image data output terminal 52. Therefore, external displayer 53 receives the aforesaid output image data for outside and displays a score (See FIG. 9(B)).

Further, assuming that the cursor has moved to a main body display position (lowermost position) by the aforesaid process of step S208, the procedure goes to step S220 by the determining process of step S210. In step S220, the main body display flag LCF2 is set to be "1", while the lyric flag LRF2 and the score flag SCF2 are reset to be "0".

After the aforesaid process of step S220, the image data stored in image data memory 23a in display control circuit 23 is read out in step S222, and the image data is written into image data memory 51a for outside in image data output circuit 51 as an image data for outside. Thereafter, the execution of this screen use mode switching program is ended in step S226. In other words, the image data for outside is changed to an image data for main body. Image data output circuit 51 reads the image data for outside that is written in image data memory 51a for outside, and outputs it to image data output terminal 52. Therefore, external displayer 53 displays the same screen as display 21.

Further, if display 21 is displaying a screen other than the aforesaid tone color setting screen or the mode setting screen for external displayer 53, CPU 31 determines as "NO" respectively in steps S202 and S206, and carries out other processes in step S224. Thereafter, the execution of this screen use mode switching program is ended in step S226. In this process of step S224, operation of the electronic musical instrument other than the tone color setting or the mode setting of external displayer 53 is set and controlled in accordance with a combination of the control operators 22 located near display 21 and the display screen of display 21.

Next, an operation of allowing automatic play or controlling the display of display 21 and external displayer 53 on the basis of the music data stored in the hard disk HD of external storage device 34 will be described. In this case, operation of any of the control operators 22 sets the electronic musical instrument to an automatic play mode. In this automatic play mode, CPU 31 repeatedly executes the automatic play setting program of FIG. 5 for every predetermined period of time.

This automatic play setting program is started in step S300, and selects a piece of music as an object in step S302. In this selection, CPU 31 reads each of the music title data in the plurality of music data stored in the hard disk HD of external storage device 34, and displays a plurality of music titles on display 21 on the basis of the music title data. Then, by an operation of control operators 22, the user selects one piece of music from among the plurality of music titles now being displayed. This allows a set of music data made of index data, automatic play data, lyric displaying data, and score displaying data related to the selected piece of music to be transferred and stored into RAM 33.

Further, if the music data related to the music desired by the user is not stored in the hard disk HD, a music data related to the desired music may be read into RAM 33 from a compact disk CD, a mini disk MD, or a flexible disk FD that stores other music data, or alternatively a music data related to the desired music may be read into RAM 33 from outside via communication network 64. In this case, however, the music data written into RAM 33 may also be written into the hard disk HD so as to allow repeated use of the music data.

Next, an operation of the start operator and the stop operator included in the control operators 22 is detected in step S304. Further, whether the operation flag RUN is "0" or not is determined in step S304. This operation flag RUN represents the state of stopped automatic play when it is "0", and represents the state of operating automatic play when it is "1". When the automatic play is in a state of being stopped and the operation flag is set to be "0", CPU 31 determines as "YES" in step S306, and determines in step 308 whether the ON operation of the start operator is detected or not by the aforesaid process of step S304. If the ON operation of the start operator is not detected by the process of step S304, CPU 31 determines as "NO" in step S308, and ends the execution of this automatic play setting program in step S328.

On the other hand, if the ON operation of the start operator is detected by the process of step S304, CPU 31 determines as "YES" in step S308, and sets the operation flag RUN to be "1" in step S310. After this process of step S310, CPU 31 determines in step S312 whether the lyric flag LRF1 is "1" or not, and determines in step S314 whether the score flag SCF1 is "1" or not. If both of the flags LRF1, SCF1 are "0", CPU 31 determines as "NO" in both of the steps S312, S314, and the procedure goes to step S320.

If the lyric flag LRF1 is "1", CPU 31 determines as "YES" in step S312, and reads in step S316 the lyric data of a predetermined interval from the beginning among the lyric displaying data in the music data that are related to the aforesaid selected piece of music and written into RAM 33 from the hard disk HD, i.e. external storage device 34. Then, the read lyric displaying data is converted into a lyric image data and written into image data memory 23a. In other words, the image data for main body is changed to initial lyric screen data. Display control circuit 23 controls display 21 on the basis of the lyric image data written in image data memory 23a, and displays on display 21 an initial lyric screen of the selected piece of music such as shown in FIG. 9(A).

If the score flag SCF1 is "1", CPU 31 determines as "NO" in step S312 and determines as "YES" in step S314, and reads in step S318 the score data of a predetermined interval from the beginning among the score displaying data in the music data that are related to the aforesaid selected piece of music and written into RAM 33 from the hard disk HD, i.e. external storage device 34. Then, the read score displaying data is converted into a score image data and written into image data memory 23a. In other words, the image data for main body is changed to initial score screen data. Display control circuit 23 controls display 21 on the basis of the score image data written in image data memory 23a, and displays on display 21 an initial score screen of the selected piece of music such as shown in FIG. 9(B).

After the aforesaid processes of steps S312 to S318, CPU 31 determines in step S320 whether the lyric flag LRF2 is "1" or not, and determines in step S322 whether the score flag SCF2 is "1" or not. If both of the flags LRF2, SCF2 are "0", CPU 31 determines as "NO" in both of the steps S320, S322, and ends the execution of this automatic play setting program in step S328.

If the lyric flag LRF2 is "1", CPU 31 determines as "YES" in step S320 and, in step S324, forms the initial lyric image data of the selected piece of music and writes it into image data memory 51a for outside in image data output circuit 51 in the same manner as in the case of the aforesaid step S316. Thereafter, the execution of this automatic play setting program is ended in step S328. In other words, the image data for outside is changed to the initial lyric screen data of the selected piece of music. Here, if the lyric flag LRF1 is "1" as well, the same lyric screen data as in the aforesaid step of S316 may be used. Image data output circuit 51 reads the image data for outside that is written in image data memory 51a for outside, and outputs it to image data output terminal 52. Therefore, external displayer 53 receives the aforesaid output image data for outside and displays the initial lyric of the selected piece of music (See FIG. 9(A)).

If the score flag SCF2 is "1", CPU 31 determines as "NO" in step S320 and determines as "YES" in step S322 and, in step S326, forms the initial score image data of the selected piece of music and writes it into image data memory 51a for outside in image data output circuit 51 in the same manner as in the case of the aforesaid step S318. Thereafter, the execution of this automatic play setting program is ended in step S328. In other words, the image data for outside is changed to the initial score screen data of the selected piece of music. Here, if the score flag SCF1 is "1" as well, the same score screen data as in the aforesaid step of S318 may be used. Image data output circuit 51 reads the image data for outside that is written in image data memory 51a for outside, and outputs it to image data output terminal 52. Therefore, external displayer 53 receives the aforesaid output image data for outside and displays the initial score of the selected piece of music (See FIG. 9(B)).

By execution of such an automatic play setting program, the initial lyric and score of the selected piece of music are selectively displayed on display 21 and on external displayer 53 in accordance with the lyric flags LRF1, LRF2 and the score flags SCF1, SCF2 that are set by the aforesaid main body image mode setting program and the screen use mode switching program.

Figure 5:
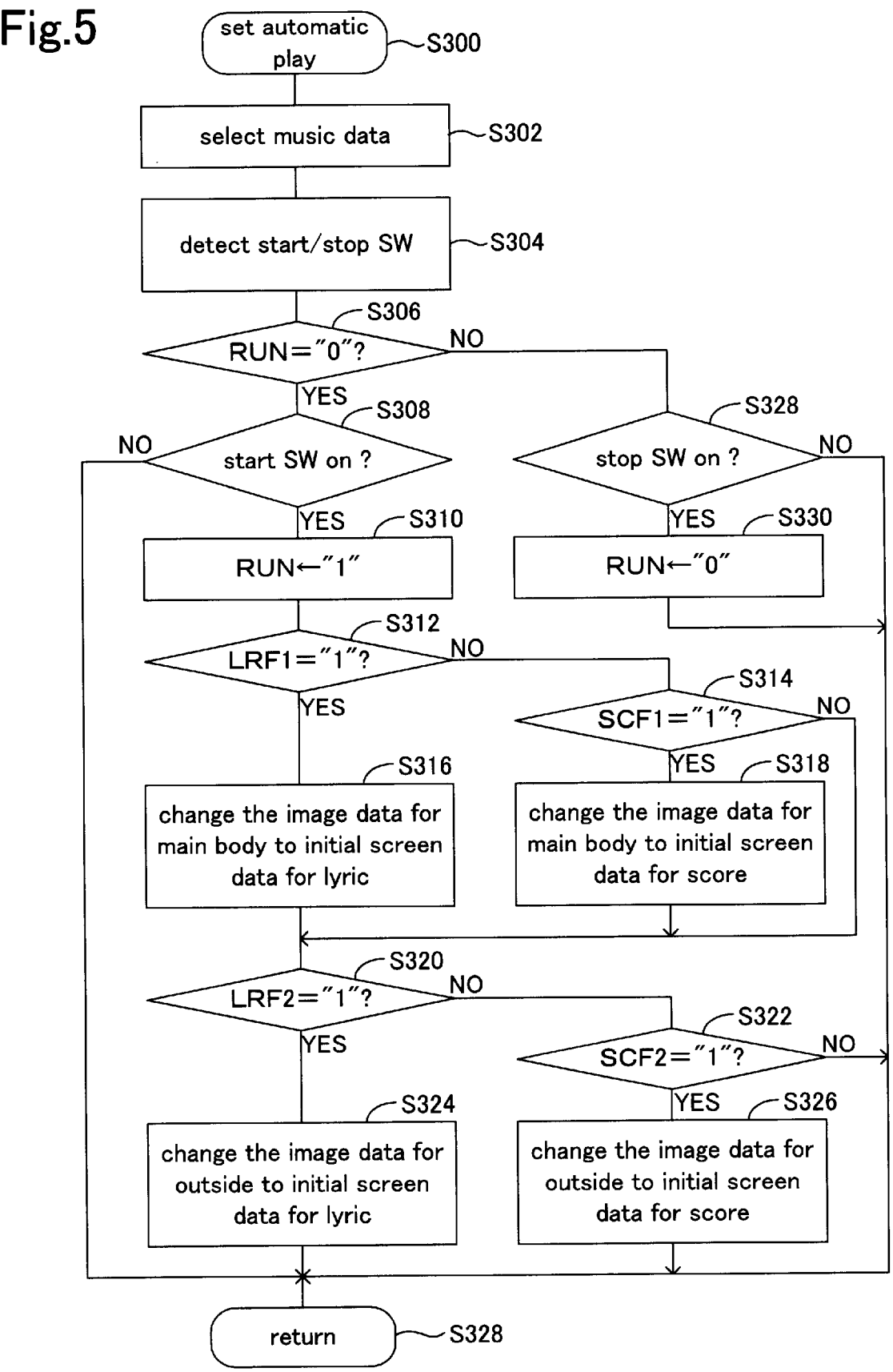
FIG. 5 is a flowchart of an automatic play setting program executed by the CPU of FIG. 1.
Figure 6:
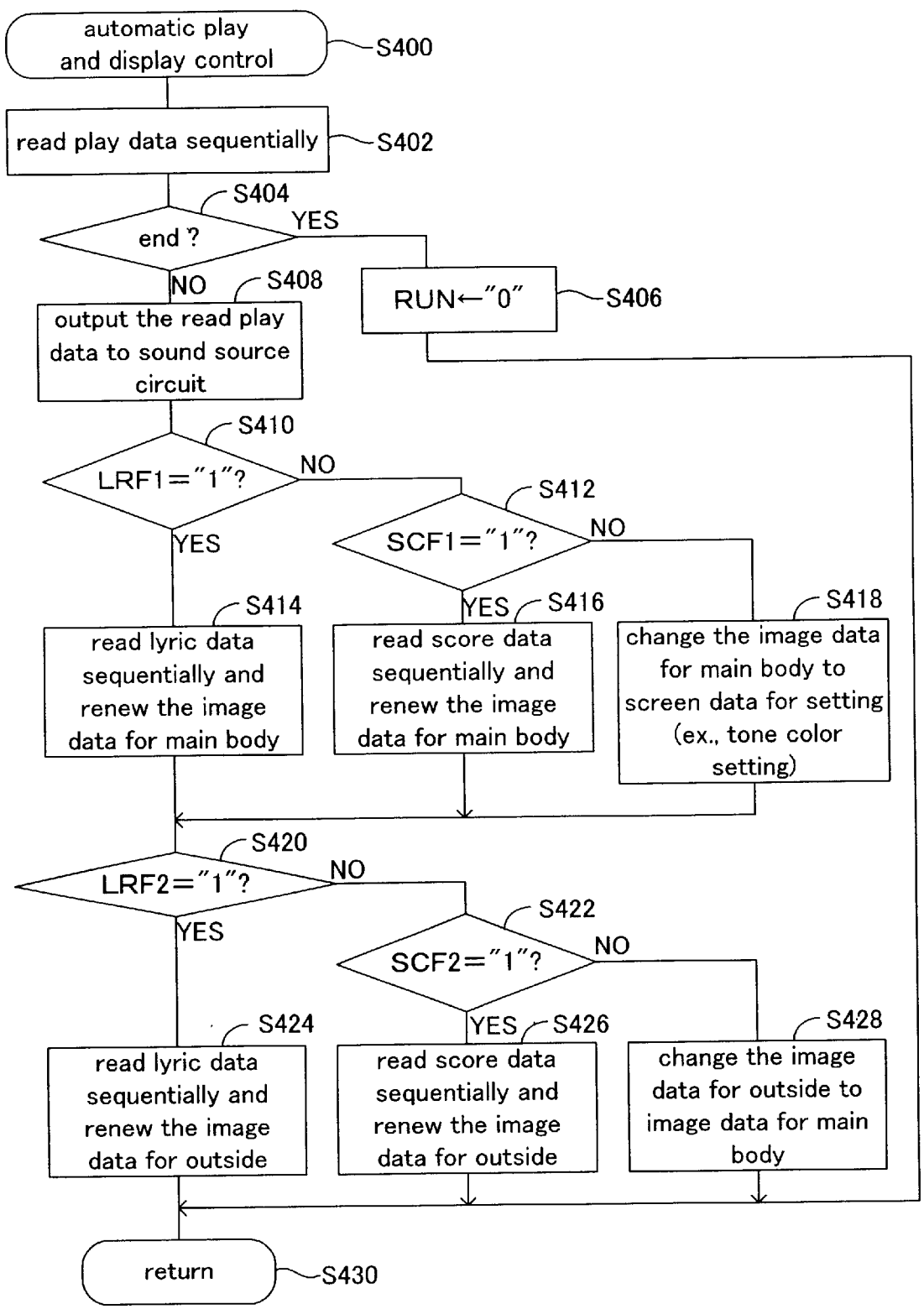
FIG. 6 is a flowchart of an automatic play and display control program executed by the CPU of FIG. 1.

Next, the reproduction operation of the music sound signals by automatic play and the progression operation of lyric and score display will be described. As described before, when the operation flag RUN is set to be "1", CPU 31 starts to execute the automatic play and display control program of FIG. 6 for every short period of time that accords with the play tempo set by a program (not illustrated). The execution of this program is started in step S400, and the process of reading the automatic play data transferred to RAM 33 by the aforesaid process of step S302 of FIG. 5 is carried out in step S402. In this reading process, the play event data (key-on or key-off data, note number data, and velocity data) and end data are successively read out for every period of time defined by a timing data.

Next, CPU 31 determines whether the aforesaid read data is an end data or not in step S404. If the aforesaid read data is an end data, CPU 31 determines as "YES" in step S404, returns the operation flag RUN to "0" in step S406, and ends the execution of the automatic play and display control program in step S430. In this case, this ends the automatic play.

Further, if the aforesaid read data is not an end data, i.e. if it is a play event data, CPU 31 determines as "NO" in step S404, and supplies the aforesaid read play event data (key-on L or key-off data, note number data, and velocity data) to sound source circuit 40 in step S408. In sound source circuit 40, music sound signals are generated on the basis of the aforesaid supplied play event data. In this case, the start or end of generation of the music sound signals is controlled by the key-on or key-off data; the pitch frequency of the generated music sound signals is controlled by the note number data; and the volume of the generated music sound signals is controlled by the velocity data. Then, these music sound signals are output to sound system 41 which in turn generates the music sounds. As a result of this, music sounds constituting the music are successively generated from the electronic musical instrument on the basis of the automatic play data related to the selected piece of music.

After the aforesaid process of step S408, CPU 31 determines whether the lyric flag LRF1 is "1" or not in step S410, and determines whether the score flag SCF1 is "1" or not in step S412.

If the lyric flag LRF1 is "1", CPU 31 determines as "YES" in step S410, and in step S414 reads the lyric data constituting the lyric displaying data transferred to RAM 33 by the aforesaid process of step S304 of FIG. 5, for every period of time defined by the timing data, and renews the image data for main body that is stored in image data memory 23a, on the basis of the read lyric data. In this renewal, CPU 31 determines the position of progression of the music by the newly read lyric data, and rewrites the image data for main body for displaying the position of progression.

Display control circuit 23 then controls display 21 on the basis of the renewed image data for main body in image data memory 23a, so that the position of progression of the music is added to the lyric display such as shown in FIG. 9(A) on display 21. This display of the position of progression may be implemented by moving a mark like a cursor in accordance with the progression of the music or by changing the displaying color of the letters constituting the lyric in accordance with the progression of the music.

If the score flag SCF1 is "1", CPU 31 determines as "NO" in step S410 and determines as "YES" in step S412, and in step S416 reads the score data constituting the score displaying data transferred to RAM 33 by the aforesaid process of step S304 of FIG. 5, for every period of time defined by the timing data, and renews the image data for main body that is stored in image data memory 23a, on the basis of the read score data. In this renewal as well, CPU 31 determines the position of progression of the music by the newly read score data, and rewrites the image data for main body for displaying the position of progression. Display control circuit 23 then controls display 21 in the same manner as described above, so that the position of progression of the music is added to the score display such as shown in FIG. 9(B) on display 21. This display of the position of progression may be implemented by moving a mark like a cursor in accordance with the progression of the music or by changing the displaying color of the notes constituting the score in accordance with the progression of the music.

Further, if both of the lyric flag LRF1 and the score flag SCF1 are "0", CPU 31 determines as "NO" in steps S410, S412 and changes the image data for main body stored in image data memory 23a to setting screen data in step S418. In this case, the setting screen flag LCF1 is set to be "1", and display 21 displays a screen in accordance with the various setting flags such as the tone color setting flag VCF1 and the external display mode setting flag ODF1. For example, if the tone color setting flag VCF1 is "1", the process of this step S418 will be the same as the process of step S106 of FIG. 3. Further, if the external display mode setting flag ODF1 is "1", the process of this step S418 will be the same as the process of step S130 of FIG. 3.

Therefore, even when such an automatic play is operating and the automatic play data, the lyric displaying data, and the score displaying data are being read out in accordance with the progression of the music, display 21 displays a screen for setting the tone color, display mode of external displayer 53, and others. As a result of this, even during the operation of automatic play, the setting of various operations of the electronic musical instrument including the setting of various elements of the music sound signals such as the tone color can be changed in accordance with the operation of the control operators by the user.

After the aforesaid processes of steps S414 to S418, CPU 31 determines whether the lyric flag LRF2 is "1" or not in step S420, and determines whether the score flag SCF2 is "1" or not in step S422.

If the lyric flag LRF2 is "1", CPU 31 determines as "YES" in step S420, and in step S424 renews the image data for outside stored in image data memory 51a for outside in image data output circuit 51 so as to display the position of progression of the lyric in the same manner as the aforesaid process of step S414, and ends the execution of this automatic play and display control program in step S430. Here, if the lyric flag LRF1 also is "1", the same image data (lyric image data) for main body as in the aforesaid step S414 may be used. Image data output circuit 51 reads the image data for outside written in image data memory 51a for outside and outputs it to image data output terminal 52. Therefore, external displayer 53 displays a lyric screen based on the aforesaid output image data for outside, whereby the position of the lyric is displayed in accordance with the progression of the music. In this case as well, this display of the position of progression may be implemented by moving a mark like a cursor in accordance with the progression of the music or by changing the displaying color of the letters constituting the lyric in accordance with the progression of the music.

If the score flag SCF2 is "1", CPU 31 determines as "NO" in step S420 and determines as "YES" in step S422, and in step S426 renews the image data for outside stored in image data memory 51a for outside in image data output circuit 51 so as to display the position of progression of the score in the same manner as the aforesaid process of step S416, and ends the execution of this automatic play and display control program in step S430. Here, if the score flag SCF1 also is "1", the same image data (score image data) for main body as in the aforesaid step S416 may be used. In this case as well, image data output circuit 51 reads the image data for outside written in image data memory 51a for outside and outputs it to image data output terminal 52. Therefore, external displayer 53 displays a score screen based on the aforesaid output image data for outside, whereby the position of the score is displayed in accordance with the progression of the music. In this case as well, this display of the position of progression may be implemented by moving a mark like a cursor in accordance with the progression of the music or by changing the displaying color of the notes constituting the score in accordance with the progression of the music.

Further, if both of the lyric flag LRF2 and the score flag SCF2 are "0", CPU 31 determines as "NO" respectively in steps S420, S422, and reads the image data stored in image data memory 23a in display control circuit 23 and writes the image data into image data memory 51a for outside in image data output circuit 51 as image data for outside in step S428, and ends the execution of this automatic play and display control program in step S430. In other words, the image data for outside is changed to image data for main body. Image data output circuit 51 reads the image data for outside written in image data memory 51a for outside, and outputs it to image data output terminal 52. Therefore, external displayer 53 displays the same screen as display 21.

Here, in the aforesaid processes of steps S414, S416, S424, S426, when the reading of the lyric data or score data related to the last letters or notes of the lyric or score that are being displayed on display 21 or on external displayer 53 is ended, the following process is carried out in addition to the aforesaid display control of the position of progression of the music. Namely, in reading the next lyric data and score data, lyric data or score data of a predetermined interval are read out from the next lyric data or score data, and these read lyric data or score data of the predetermined interval are converted into lyric screen data or score screen data, and the new lyric screen or score screen is displayed on display 21 or on external displayer 53.

Figure 4:
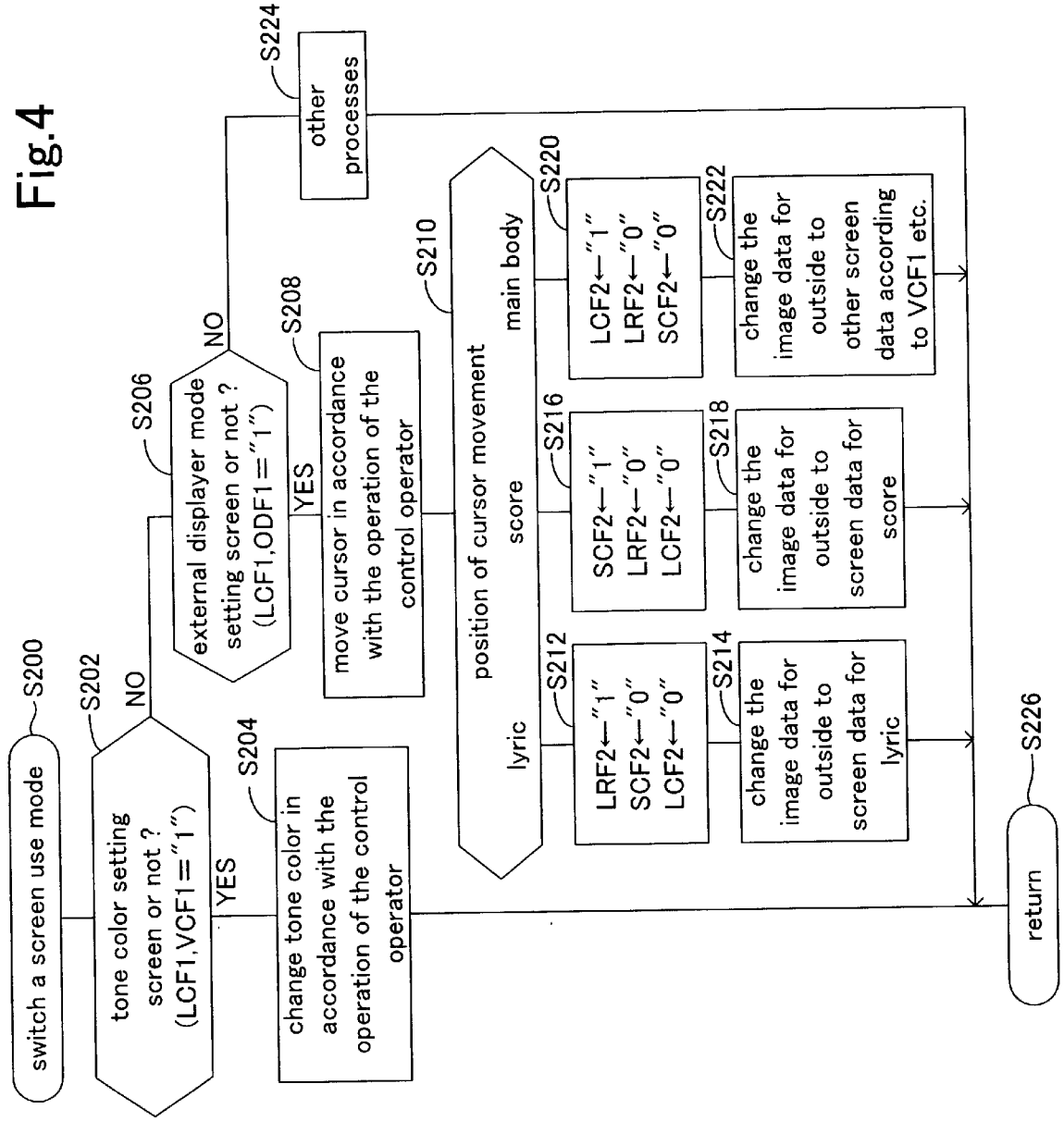
FIG. 4 is a flowchart of a screen use mode switching program executed by the CPU of FIG. 1.

Further, even during the operation of such automatic display or even during the display of the lyric or score, the main body image mode setting program of FIG. 3 and the screen use mode switching program of FIG. 4 are carried out by the operation of control operators 22, whereby the displaying state of display 21 or external displayer 53 may be changed to a music sound element such as the tone color or tone volume, or to a display mode of external displayer 53.

As will be understood from the above description, in the aforesaid embodiment, image data memory 23a is provided in display control circuit 23 and, independently from this, image data memory 51a for outside is provided in image data output circuit 51, thereby allowing selective and independent display of the screens for setting various modes of the electronic musical instrument, the lyric screen, and the score screen on display 21 and on external displayer 53 by the operation of control operators 22. Therefore, according to the above-described embodiment, even if the player changes the displaying state of display 21 to a setting screen so as to change the music sound element such as a tone color, tone volume, or effect of the playing sound while the lyric or score is being displayed on external displayer 53, one can continue to display the lyric or score on external displayer 53. This leads to an advantage when another person is singing a song by looking at a lyric displayed on external displayer 53 or is playing another musical instrument by looking at a score displayed on external displayer 53 while listening to the playing sound of the electronic musical instrument played by the player.

Further, such display modes of display 21 can be roughly classified into three types, i.e. lyric screen display, score screen display, and setting screen display. The setting screen display can be further switched to various states such as the setting of the tone color, tone volume, or display mode of external displayer 53. On the other hand, display modes of external displayer 53 can be roughly classified into three types, i.e. lyric screen display, score screen display, and display of the same screen as on the main side. In the display of the same screen as on the main side, the same screen as display 21 is displayed. In other words, if a lyric is being displayed on display 21, the lyric is displayed on external displayer 53 as well. If a score is being displayed on display 21, the score is displayed on external displayer 53 as well.

If various setting screens are displayed on display 21, the same setting screens are displayed on external displayer 53 as well. Therefore, by using external displayer 53, the playing operation of the player using display 21 can be monitored at all times, and this displaying function can be advantageously used for education, playing in concert, and other purposes.

Further, in the electronic musical instrument of the above-described embodiment, music data made of automatic play data, lyric displaying data, and score displaying data are stored, and these data are successively read out in accordance with the progression of the music, thereby enabling generation of automatic play sounds and display of the progression of lyric and score. Therefore, according to this embodiment, a player playing the electronic musical instrument or another person looking at the external displayer can advantageously play a musical instrument or sing a song while listening to an automatic play or while looking at a lyric or score that changes its displaying state in accordance with the progression of the music.

Here, in the above-described embodiment, only the lyric display screen, score display screen, and various mode setting screen have been given as examples of the screen displayed on display 21 and on external displayer 53; however, other information can be displayed as well.

Also, in the above-described embodiment, description has been given on an example in which the present invention is applied to an electronic musical instrument having a keyboard as a play operator; however, the present invention can be applied to various musical instruments having touch plates, press buttons, strings, or the like as a play operator.

Further, in carrying out the present invention, it is not limited to the foregoing embodiments or variations thereof, but various modifications can be made as long as they do not depart from the object of the present invention.

What is claimed is:

1. An electronic musical instrument comprising:
   a play operator that designates a pitch of a music sound signal to be generated;
   a control operator that is disposed on an operation panel;
   a main-side displayer that is disposed on the operation panel and capable of selectively displaying a setting screen for setting a music sound element of the music sound signal to be generated and a lyric or score screen for displaying a lyric or score;
   an image data output terminal for outputting an image data to outside;
   a display control circuit that has a first image data memory for main body and controls a display of said main-side displayer on a basis of an image data stored in said first image data memory for main body;
   an image data output circuit that has a second image data memory for outside and outputs an image data stored in said second image data memory for outside to said image data output terminal;
   a music sound element setting controller for setting and controlling the music sound element of the music sound signal to be generated by a combination of a setting screen displayed on said main-side displayer and an operation of said control operator; and
   an image data writing circuit for selectively writing an image data into said first image data memory for main body and into said second image data memory for outside in accordance with an operation of said control operator.

2. The electronic musical instrument according to claim 1, further comprising a display data memory for storing in advance a setting screen data for displaying said setting screen and a lyric or score data for displaying the lyric or score, wherein said image data writing circuit selectively reads said setting screen data and said lyric or score data from said display data memory in accordance with an operation of said control operator, and selectively renews the image data stored in said first image data memory for main body and the image data stored in said second image data memory for outside on a basis of said read data.

3. The electronic musical instrument according to claim 2, wherein said image data writing circuit reads said lyric or score data from said display data memory in accordance with lapse of time, and renews the image data stored in said first image data memory for main body and the image data stored in said second image data memory for outside on a basis of said read lyric or score data.

4. The electronic musical instrument according to claim 1, further comprising:
   an automatic play data memory for storing an automatic play data for automatic generation of the music sound signal; and
   an automatic play data reading circuit for reading the automatic play data stored in said automatic play data memory in accordance with lapse of time and for controlling the generation of the music sound signal on a basis of said read automatic play data.

5. An electronic musical instrument comprising:
   a display that is disposed on an operation panel;
   a first memory for storing a first image data;
   a display controller for controlling said display on a basis of the first image data stored in said first memory to display a first screen on said display;
   a second memory for storing a second image data for displaying a second screen of an external displayer, wherein the type of the second image data is different from the type of the first image data stored in said first memory;
   an output circuit for reading the second image data stored in said second memory and for outputting the read second image data to an external displayer.

6. The electronic musical instrument according to claim 5, further comprising an output terminal connected to said output circuit, wherein said output circuit outputs the second image data via said output terminal to said external displayer that is connected to said output terminal.

7. The electronic musical instrument according to claim 5, wherein said first image data is a lyric data for displaying the lyric screen on said display, and said second image data is a score data for displaying the score screen on said external displayer.

8. The electronic musical instrument according to claim 5, wherein said first image data is a score data for displaying the score screen on said display, and said second image data is a lyric data for displaying the lyric screen on said external displayer.

9. The electronic musical instrument according to claim 5, wherein said first image data is a music sound element setting data for displaying the music sound element setting screen on said display for setting the music sound element, and said second image data is a lyric or score data for displaying the lyric or score screen on said external displayer.

* * * * *